US009213972B2

(12) United States Patent
Dorso et al.

(10) Patent No.: US 9,213,972 B2
(45) Date of Patent: Dec. 15, 2015

(54) SYSTEMS AND METHODS FOR FAST MOBILE PAYMENT

(76) Inventors: Gregory Dorso, San Jose, CA (US); Rachad Alao, Montreal (CA)

(*) Notice: Subject to any disclaimer, the term of this patent is extended or adjusted under 35 U.S.C. 154(b) by 679 days.

(21) Appl. No.: 13/561,244

(22) Filed: Jul. 30, 2012

(65) Prior Publication Data
US 2013/0054320 A1 Feb. 28, 2013

Related U.S. Application Data

(60) Provisional application No. 61/528,955, filed on Aug. 30, 2011, provisional application No. 61/567,120, filed on Dec. 6, 2011.

(51) Int. Cl.
*G06Q 20/00* (2012.01)
*G06Q 30/00* (2012.01)
*G06Q 40/00* (2012.01)
*G06Q 20/32* (2012.01)
*G06Q 30/02* (2012.01)
*G06Q 30/06* (2012.01)
*G06Q 20/42* (2012.01)

(52) U.S. Cl.
CPC ......... *G06Q 20/3276* (2013.01); *G06Q 20/42* (2013.01); *G06Q 30/0238* (2013.01); *G06Q 30/0268* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 5,640,002 A * | 6/1997 | Ruppert et al. | 235/462.46 |
| 5,943,422 A | 8/1999 | Van Wie et al. | |
| 7,367,500 B2 * | 5/2008 | Fajkowski | 235/383 |
| 7,387,250 B2 | 6/2008 | Muni | |
| 7,774,283 B2 | 8/2010 | Das et al. | |
| 8,001,047 B2 * | 8/2011 | Peckover et al. | 705/41 |
| 8,005,985 B2 * | 8/2011 | Philyaw | 709/238 |
| 8,025,222 B2 * | 9/2011 | Kochevar et al. | 235/382 |
| 8,407,097 B2 * | 3/2013 | Sperduti et al. | 705/22 |
| 8,429,005 B2 * | 4/2013 | Mannik et al. | 705/14.1 |
| 8,459,559 B2 * | 6/2013 | Shadwell et al. | 235/472.01 |
| 8,462,949 B2 * | 6/2013 | Anderson et al. | 380/252 |
| 8,826,399 B2 * | 9/2014 | Dorso et al. | 726/6 |

(Continued)

FOREIGN PATENT DOCUMENTS

WO    WO 2008/018766    2/2008

OTHER PUBLICATIONS

International Search Report for International Application No. PCT/US2012/048778, mailed Oct. 4, 2012, 2 pages.

(Continued)

*Primary Examiner* — Gregory Johnson
(74) *Attorney, Agent, or Firm* — Nixon Peabody LLP

(57) ABSTRACT

A method of completing transactions using a device includes displaying a pictogram including transaction details associated therewith by a merchant. The mobile device acquires the pictogram. The mobile device or a remote server decodes the transaction details. The mobile device displays for a user the decoded transaction details. If the decoded transaction details are acceptable to the user, the user accepts, via the mobile device, the decoded transaction details. The mobile device transmits a confirmation of acceptance by the user to a remote server. The remote server transmits a payment request for the payment amount reflected in the transaction details to a payment gateway. The payment gateway validates the payment request. The merchant and the device receive a payment confirmation.

32 Claims, 2 Drawing Sheets

(56) References Cited

U.S. PATENT DOCUMENTS

| | | | |
|---|---|---|---|
| 2001/0003177 A1* | 6/2001 | Schena et al. | 705/27 |
| 2002/0019784 A1* | 2/2002 | Ritz | 705/26 |
| 2004/0006509 A1* | 1/2004 | Mannik et al. | 705/14 |
| 2004/0056105 A1* | 3/2004 | Silverbrook et al. | 235/494 |
| 2004/0122310 A1* | 6/2004 | Lim | 600/426 |
| 2005/0060232 A1* | 3/2005 | Maggio | 705/14 |
| 2005/0071235 A1* | 3/2005 | Nguyen et al. | 705/24 |
| 2005/0097179 A1* | 5/2005 | Orme | 709/207 |
| 2005/0174510 A1* | 8/2005 | Yano et al. | 349/98 |
| 2005/0187677 A1* | 8/2005 | Walker | 701/16 |
| 2005/0211768 A1* | 9/2005 | Stillman | 235/381 |
| 2005/0230473 A1* | 10/2005 | Fajkowski | 235/383 |
| 2006/0282319 A1* | 12/2006 | Maggio | 705/14 |
| 2007/0121937 A1* | 5/2007 | Kochevar et al. | 380/30 |
| 2007/0187266 A1* | 8/2007 | Porter et al. | 206/232 |
| 2007/0194123 A1 | 8/2007 | Frantz et al. | |
| 2007/0205867 A1* | 9/2007 | Kennedy et al. | 340/10.1 |
| 2008/0222048 A1 | 9/2008 | Higgins et al. | |
| 2008/0228507 A1* | 9/2008 | LaRue et al. | 705/1 |
| 2008/0229098 A1 | 9/2008 | Ishak | |
| 2008/0288384 A1* | 11/2008 | Collins et al. | 705/35 |
| 2008/0290987 A1* | 11/2008 | Li | 340/5.1 |
| 2009/0055307 A1* | 2/2009 | Choudary et al. | 705/37 |
| 2009/0101708 A1* | 4/2009 | Kochevar et al. | 235/382 |
| 2009/0112768 A1 | 4/2009 | Hammad et al. | |
| 2009/0144151 A1* | 6/2009 | Pajot | 705/14 |
| 2009/0204498 A1* | 8/2009 | Galit | 705/14 |
| 2010/0241527 A1* | 9/2010 | McKenna et al. | 705/27 |
| 2010/0313252 A1 | 12/2010 | Trouw | |
| 2011/0029370 A1* | 2/2011 | Roeding et al. | 705/14.38 |
| 2011/0033121 A1* | 2/2011 | Evanitsky | 382/218 |
| 2011/0078081 A1 | 3/2011 | Pirzadeh et al. | |
| 2011/0106624 A1* | 5/2011 | Bonner et al. | 705/14.58 |
| 2011/0161147 A1* | 6/2011 | Gannon et al. | 705/14.13 |
| 2011/0270751 A1* | 11/2011 | Csinger et al. | 705/42 |
| 2012/0061462 A1* | 3/2012 | Shadwell et al. | 235/375 |
| 2012/0105875 A1* | 5/2012 | Chinnici et al. | 358/1.9 |
| 2012/0166286 A1* | 6/2012 | Schuster et al. | 705/14.64 |
| 2013/0054320 A1* | 2/2013 | Dorso et al. | 705/14.4 |
| 2013/0145446 A1* | 6/2013 | Dorso et al. | 726/6 |
| 2014/0142966 A1* | 5/2014 | Badgett et al. | 705/2 |
| 2014/0236695 A1* | 8/2014 | Shvarts et al. | 705/14.25 |
| 2014/0276122 A1* | 9/2014 | Dulak et al. | 600/483 |

OTHER PUBLICATIONS

Written Opinion for International Application No. PCT/US2012/048778, mailed Oct. 4, 2012, 3 pages.
International Search Report for International Application No. PCT/US2012/067204, mailed Mar. 28, 2013, 3 pages.
Written Opinion for International Application No. PCT/US2012/067204, mailed Mar. 28, 2013, 4 pages.

* cited by examiner

SYSTEMS AND METHODS FOR FAST MOBILE PAYMENT

CROSS-REFERENCE TO RELATED APPLICATIONS

This application claims the benefit of, and priority to, U.S. Provisional Patent Application Ser. No. 61/528,955, filed Aug. 30, 2011 and U.S. Provisional Patent Application Ser. No. 61/567,120, filed Dec. 6, 2011, the contents of which are incorporated entirely herein by reference.

FIELD OF THE INVENTION

The present invention relates to an electronic device payment method and, more particularly, to a method for making payments using a mobile communication device.

BACKGROUND OF THE INVENTION

There is a need for mobile payment systems that do not involve Radio Frequency (RF) communication between the parties that request and provide the authentication tokens. Mobile payment systems involving RF communication are more expensive and more difficult in implementation. Such systems require introduction of expensive hardware at Point-of-Sale and also in the hands of the consumers, The new mobile payment systems must work with existing, deployed hardware without the need to introduce new expensive hardware.

Mobile payment systems must preserve or improve the security of existing payment methods. The credit card or bank card information must not be available to any untrusted paths. Such information must be sent only to trusted backend systems.

Another objective for the system is to be more eco-friendly by reducing the amount of paper required to complete a transaction as compared to paper-based transaction mechanisms.

SUMMARY OF THE INVENTION

In accordance with one embodiment, a method of completing transactions using a device includes displaying a pictogram including transaction details associated therewith by a merchant. The mobile device acquires the pictogram. The mobile device or a remote server decodes the transaction details. The mobile device displays for a user the decoded transaction details. If the decided transaction details are acceptable to the user, the user accepts, via the mobile device, the decoded transaction details. The mobile device transmits a confirmation of acceptance by the user to a remote server. The remote server transmits a payment request for the payment amount reflected in the transaction details to a payment gateway. The payment gateway validates the payment request. The merchant and the device receive a payment confirmation.

In accordance with a further aspect of the present invention, a device for completing transactions includes processing hardware for acquiring a pictogram including encoded transaction details and for decoding the transaction details from the pictogram. The device includes a user interface for displaying the decoded transaction details for a user of the mobile device. The device further includes a signal interface configured to send a signal indicating user acceptance or rejection of the decoded transaction details to a remote server. If the user has accepted the transaction details, the remote server is configured to take the appropriate steps to process the transaction as defined by the transaction details, either directly or as a proxy to a subsystem charged of processing the transaction. The signal interface is further configured to receive a signal indicating transaction completion.

An additional aspect of the present invention relates to a system for completing transactions. The system includes a remote server coupled to a first processor. The remote server is configured to generate a pictogram including therein an encoded set of transaction details in response to a pictogram generation request from a merchant check-out system configured to display the pictogram. The system also includes a device configured to acquire the pictogram. The device decodes the pictogram or the remote server decodes the pictogram in response to a decode pictogram request from the device. The device includes a user interface configured to display a decoded set of transaction details to a user for acceptance or rejection by the user. The device is configured to transmit an acceptance of the transaction details to the remote server if the user accepts the transaction details. The system includes a gateway transaction system coupled to a second processor, the gateway transaction system being configured to validate and process, directly or as a proxy to a subsystem, the transaction reflected in the transaction details. The gateway transaction system is further configured to transmit a payment confirmation to the remote server.

In accordance with a further aspect of the present invention, a mobile device for completing transactions includes hardware for acquiring an environmental stimulus including encoded transaction details and for decoding the transaction details from the stimulus. The mobile device includes a user interface for displaying the decoded transaction details for a user of the mobile device. The mobile device further includes a signal interface configured to send a signal indicating user acceptance or rejection of the decoded transaction details to a remote server, wherein if the user has accepted the transaction details, the remote server is configured to send a confirmation to a transaction gateway system for transaction processing and validation. The signal interface is further configured to receive a signal indicating transaction completion.

BRIEF DESCRIPTION OF THE DRAWINGS

The foregoing and other advantages of the present disclosure will become apparent upon reading the following detailed description and upon reference to the drawings.

Figure 1:
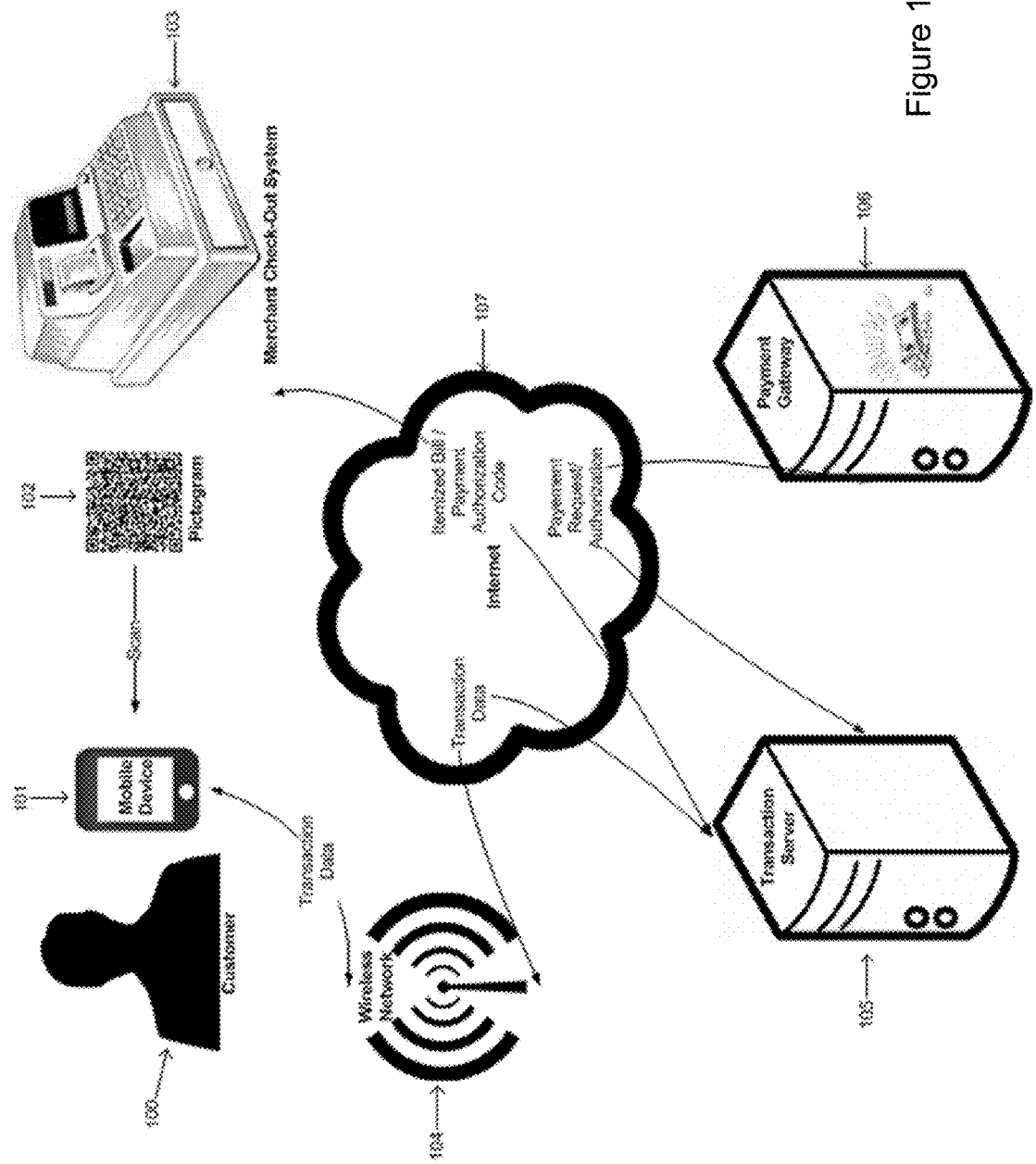
FIG. 1 is a block diagram illustrating a system for fast mobile payment.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF ILLUSTRATED EMBODIMENTS

In the following description, for purposes of explanation and not limitation, specific details are set forth, such as particular embodiments, procedures, techniques, etc. in order to provide a thorough understanding of the present invention. However, it will be apparent to those ordinarily skilled in the art that the present invention may be practiced in other embodiments that depart from these specific details.

The following discussion is intended to provide a brief, general description of suitable computer processing environments in which the methods and apparatus described herein may be implemented. In one non-limiting example, the method and apparatus will be described in the general context of processor-executable instructions, such as program modules, being executed in a distributed computing environment in which tasks may be performed by remote and local processing devices linked via one or more networks. Those of ordinary skill in the art will appreciate that the method may be practiced with any number of suitable computer system configurations and is not limited to the described configurations.

Technical features described herein can be used to construct various embodiments of methods and apparatus for providing a fast way to authorize payment to a third party using a camera enabled device. In one approach, a check-out system (including an electronic check-out system presented on a webpage) displays a receipt along with a pictogram (e.g. regular Bar Code, 2D Bar Code, Coded Picture, Suite of Symbols, etc.) for a customer to scan with a device capable of scanning (e.g. Mobile Phone, Tablet, Portable Game Console, or computer with scanning capability etc.), herein referred to as "device".

Referring now to FIG. 1, a user or customer 100 has a device 101 that has scanning capabilities. The user 100 points the device 101 at a pictogram 102 to retrieve details or predetermined characteristics associated with the pictogram 102. The pictogram 102 may be present on a display screen of a merchant check-out system 103 or it may be present on printed media, such as a magazine. In another embodiment of the present invention, the pictogram 102 is printed on a physical transaction receipt provided by a merchant to a customer 100. The details associated with the pictogram 102 include a receipt summary associated with goods or services that the user 100 desires to purchase. The receipt summary is obtained from a transaction server 105 or other device. The transaction server 105 is coupled to a processor. A display of the mobile device 101 displays the receipt summary along with a payment option. A customer 100 then proceeds with the purchase of the goods or services through an interaction with the device 101 (for example by pressing a "Proceed" button in device user interface). The payment is processed and validated by a payment gateway 106 that is coupled to a processor. A merchant's check-out system 103 receives a confirmation of payment, thus completing the transaction. The merchant's check-out system 103 is coupled to a processor.

According to a further aspect of the present invention, a user or customer 100 has a device 101 that can capture environmental stimuli (e.g., pictures, sounds, vibrations, etc.). The user 100 captures a specifically created stimulus (image, sound, vibrations, radio-frequency signals, etc., or any combination thereof) with his or her device 101 to retrieve details or predetermined characteristics associated with the stimulus. The stimulus may be reproduced (images can be displayed, sounds can be played, motion can be mechanically replayed, etc.) by a merchant check-out system 103 or it may be present on printed media, such as a magazine. The details associated with the environmental stimulus include a receipt summary associated with goods or services that the user 100 desires to purchase. The receipt summary is obtained from a transaction server 105 or other suitable device. The transaction server 105 is coupled to a processor. A display of the mobile device 101 displays the receipt summary along with a payment option. A customer 100 then proceeds with the purchase of the goods or services through an interaction with the device 101 (for example by pressing a "Proceed" button in device user interface). The payment is processed and validated by a payment gateway 106 that is coupled to a processor. A merchant's check-out system 103 receives a confirmation of payment, thus completing the transaction. The merchant's check-out system 103 is coupled to a processor.

The transaction server 105 is a server that keeps persistent records of transactions between a merchant's check out system 103 and a customer 100, and orchestrates the required steps of successful transaction processing, from creation (at the check out system 103); retrieval, display and acceptance (at the user 100's device 101); funding (through the payment gateway 106); and finally confirmation (to the merchant).

The payment gateway 106 is an online payment processing solution that enables authorization and acceptance of payments for various businesses, including electronic businesses, online retailers, physical retailers and others by credit card, electronic check, direct bank withdrawal, bill pay, PAYPAL, etc. The payment gateway 106 serves the purpose equivalent to that of a physical point of sale terminal located in retail outlets. The payment gateway 106 acts as a transaction gateway proxy and effectively handles credit card transactions itself on behalf if the merchant. This guarantees that the customer's sensitive information such as credit card number or account number is never transmitted to the merchant or merchant check-out system 103. According to another aspect of the present invention, the payment gateway 106 protects sensitive data such as credit card information by encrypting such information to ensure that it is passed securely between the customer 100 and the merchant check-out system 103 and also between the merchant check-out system and the transaction server 105. The payment gateway 106 forwards the transaction information that it receives from the transaction server 105 to the payment processor used by the merchant's bank. The payment processor provides a response to the payment gateway 106 whether the transaction has been approved or denied. The payment gateway 106 then provides the response to the transaction server 105. The communications to and from the payment gateway 106 are secured. In one embodiment, the communications to and from the payment gateway 106 are secured via Hypertext Transfer Protocol Secure (HTTPS) protocol. A specific payment gateway 106 is selected based on the selected payment method.

Figure 2:
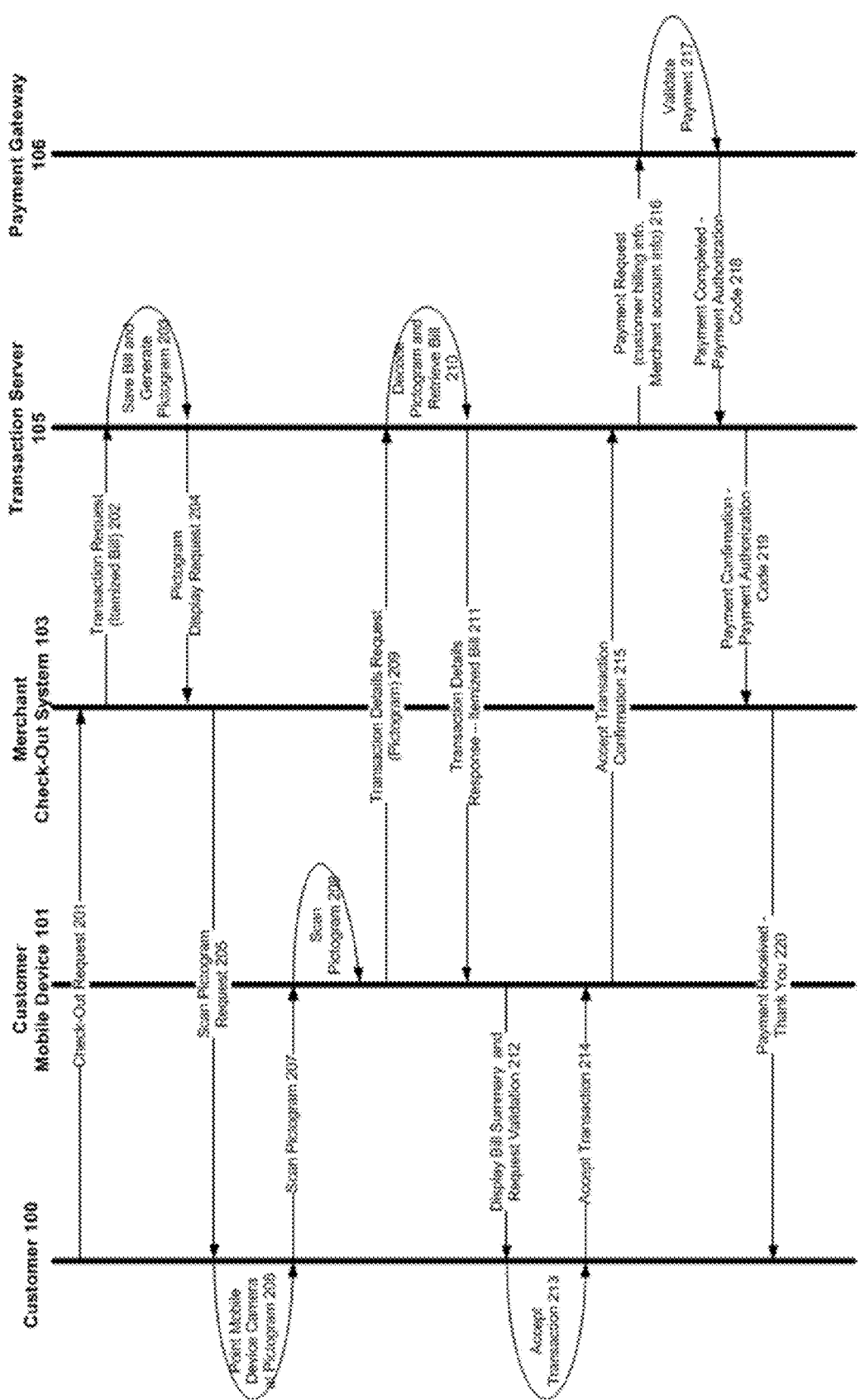
FIG. 2 is a sequence diagram describing a method to accelerate payments using a device and a pictogram.

Referring now to FIG. 2, the customer 100 enables or initiates contact with the software or application on the device 101 that processes mobile payments by scanning pictograms. The customer 100 is then authenticated. The customer 100 initiates a check-out request 201, via the mobile phone or in person, to the merchant's check-out system 103, which then contacts a secure transaction server 105 to register the transaction in step 202 by uploading the details of the transaction (e.g. detailed receipt, itemized list, summary of purchase, etc.). According to a further aspect of the present invention, the customer 100 indicates to the merchant in any suitable way that the customer 100 is ready to check out or complete the transaction. According to another aspect of the present invention, the registration of the transaction can be initiated while the transaction is being processed and before the details of the transaction are available. The authentication process takes place while the transaction is being completed and the transaction is completed when both the authentication and the transaction details are finalized.

The transaction server 105 stores this transaction information and generates in step 203 a pictogram 102. The transaction server 105 sends the generated pictogram 102 with a display request back to the merchant check-out system 103 in step 204. The pictogram 102 contains enough information to enable the transaction server 105 to retrieve the details of the transaction at a later time—it can, for example, include a transaction record identifier and/or a short summary of the transaction. The transaction server 105 stores the transaction information for a predetermined time period.

The merchant check-out system 103 displays the pictogram 102 in step 205 on a screen of the merchant check-out system 103 that is accessible to the customer 100 (in one embodiment this can be the screen of a PIN pad device meant to conduct credit card transactions). In another embodiment of the present invention, the merchant check-out system 103 displays the pictogram 103 on any suitable media that may be scanned by the customer's device 101.

The customer 100 points the device 101 at the pictogram 102 in step 206. The device 101 then scans the pictogram 102 in steps 207 and 208. According to one embodiment, in step 207, the customer 100 presses an appropriate prompt on the screen of the device 101 in order for the device 101 to scan the pictogram 102. In step 208, the device 101 performs the actual scanning and capturing of the pictogram 102. According to one embodiment, the device 101 improves the pictogram capture process by checking potential calibration marks in the pictogram 102. According to another embodiment, the device 101 continuously scans the pictogram 102 until a scan of a suitable quality or resolution is captured.

The device 101 retrieves the details of the transaction by sending in step 209 the pictogram 102 to the transaction server 105 through a secure connection (e.g., a Secure Socket Layer connection) using a wireless data network 104 (e.g., 3G/4G cellular network, Wifi network provided by the Merchant, WiMAX or any other data network). The transaction server 105 decodes the pictogram 102 and retrieves the transaction record identifier in step 210. The particular algorithm used to decode the pictogram 102 depends largely on the type of pictogram that is used. Different type of pictograms include a generated Picture, a suite of symbols, a 1-D Barcode (UPC, EAN, GS1, JAN, etc), a 2-D barcode (QR Code, EZ Code, Data Matrix, etc), a coded image (steganography or watermarking), etc,. According to one aspect of the present invention, the pictogram 102 includes a suite of symbols. Such a pictogram is generally decoded using optical character recognition (OCR) and similar algorithms to digitize the symbols. A decryption algorithm may also be used to retrieve the information following OCR. According to a further aspect of the present invention, the pictogram 102 may be a quick response code (QR code) based pictogram. A QR code pictogram 102 may be decoded by first performing a picture calibration phase using calibration markers. Then, 2D dot decoding (optionally, with error correcting code (ECC) is performed. Finally, a decryption algorithm may be used to retrieve the information from the pictogram 102 following the calibration phase and the 2D dot decoding phase. The transaction server 105 then queries its transaction database for the transaction details and then sends the retrieved transaction details, such as the itemized bill, back to the device 101 in step 211.

In another embodiment, the device 101 is configured to decode the pictogram 102 locally and to retrieve the information (e.g., transaction record identifier or transaction short summary) necessary to present a short summary of the transaction to the customer 100 and/or to retrieve the detailed transaction record from the transaction server 105. The appropriate hardware of software decoding algorithm is used for decoding the pictogram based on its specific type.

According to a further aspect of the present invention, the pictogram 102 embeds information within itself to retrieve the full details of the transaction from the transaction server. The pictogram may be decoded to a uniform resource locator (URL).

The device 101 then displays the transaction details and requests validation in step 212 from the customer 100. At this stage, the device 101 application has already authenticated the customer 100, so the transaction server 105 already knows the customer's 100 registered or preferred payment options (e.g. credit cards, debit cards, PayPal, miles, reward points, gift cards, account transfers, etc.) and can pre-select the appropriate option based on specific optimization rules (e.g. miles, cash back, etc.) that apply to the given transaction. According to another embodiment, the customer 100 may pre-set certain preferred payment options for certain merchants or retailers. For example, the customer may select a specific credit card for transactions with one merchant and a different credit card for transactions with a different merchant. The customer 100 always has an option of selecting a different payment option at time of payment from the one pre-set by the customer 100 as "preferred".

The customer 100 then sees the transaction details or summary on the display of the device 101 and is offered to accept or reject, on the device 101 itself, the transaction details in step 213. According to one embodiment, the interaction with the application can be secured using an authentication mechanism such as passwords, biometrics, security codes or questions, etc. to unlock the user interface and/or to decrypt the actual credentials that are used to authenticate with the transaction server 105.

According to another embodiment, a personal identifier (e.g. Personal Identification Number or passphrase) may be required to accept the transaction. The requirement of entering a personal identifier may be triggered by the customer 100 requirements, the device 101 requirements, or the merchant check-out system 103 requirements, or by other systems. The requirement of entering a personal identifier may be enabled when the transaction exceeds a certain predetermined amount. According to a further aspect of the present invention, the device 101 uses the personal identifier to compute the response to a challenge token sent by the transaction server 105 to validate the transaction.

Upon acceptance of the transaction by the customer 100 in step 214, the transaction server 105 is notified in step 215 that the customer 100 has accepted the transaction. The transaction server 105 then initiates the transaction in step 216 with the payment gateway 106 selected by the customer 100. The payment gateway 106 validates the payment in step 217 and retrieves an authorization code in step 218. The payment gateway 106 generally validates the payment by forwarding the payment information to the appropriate payment processor used by the merchant's bank. The authorization code is securely sent in step 219 to the merchant check-out system 103 to unlock its state machine from the "waiting for payment" state. The merchant is now free to consider the transaction completed. The merchant 103 then sends a confirmation to the customer 100 that the payment has been received in step 220. The device 101 displays the confirmation that the payment has been received on the screen of the device 101.

According to one embodiment of the present invention, the pictogram 102 may be generated by a restaurant and printed on a check that is delivered to the customer 100. The customer 100 can make the payment for the bill without having to provide his credit card to the waiter. The credit card information is not available to any untrusted paths at any point during the transaction: the payment information only travels within trusted backend systems.

In another embodiment, the system according to the present invention can be used to quickly transfer money between two device owners. In this case, a first device acts as the "merchant" and the other one acts as a "customer".

The present invention can be used to accelerate online purchases by providing both payment and shipping options to the customer 100 after a scan of the pictogram 102 displayed on the merchant's web page, magazine advertisement, or other material. The shipping information can then be automatically provided to the merchant during the transaction process.

The present invention also enables very easy selling abilities since a merchant can simply place a pictogram 102 on any printed medium (e.g., a magazine page) that the customer 100 scans to purchase an item. The system then enables the merchant to receive both the customer's 100 payment as well as the shipping information required to complete the transaction. This mechanism eliminates the need to manually create a new user profile in the merchant's online store, thus greatly accelerating the purchase process. This mechanism is essentially a "One-Scan Buy" purchase scheme. This also saves the customer 100 a lot of time in completing the purchase. Previously, the customer 100 who saw a product that he or she wished to purchase in a magazine, the customer 100 had to either call the merchant directly or go to the merchant's website to order the product. The customer 100 then had to provide all his or her details—including shipping and billing addresses and credit card information either over the phone or on the merchant's website. The present invention allows the customer 100 to simply point his or her mobile device 101 at the pictogram 102 and complete the purchase of a desired product without requiring any additional information from the customer 100.

In the event that the device 101 does not have access to an IP network to perform the transaction at the very moment of the scan, it can store all of the information in its local storage in order to initiate the stored transactions whenever the IP network becomes accessible again (in a "store and forward" fashion). According to one embodiment of the present invention, once the IP network becomes available, the customer 100 may be prompted again by the mobile device 101 to ensure that the customer 100 is still interested in purchasing the product. Once the customer 100 confirms his or her interest, the transaction is allowed to proceed. According to another aspect of the present invention, the information about the desired transaction that did not go through due to unavailability of an IP network may be stored locally for a predetermined period of time.

According to another embodiment of the present invention, the device 101 may store locally scans of several pictograms 102. The customer 100 may scan several pictograms 102 that correspond to several products or services that the customer 100 is interested in purchasing. At a later time, the customer 100 may decide precisely which products he or she wants to purchase. This allows the customer 100 to review and compare product details for several items in one place and to easily and quickly complete the purchase of desired products or services. This eliminates the need of going to multiple websites to compare product details.

According to one embodiment of the present invention, the transaction server 105 has the capabilities of optimizing the payment method by selecting the most appropriate one (e.g., the right credit card) based on user defined business rules (e.g., cash back on meals for card A vs. better discounts when purchasing gas with card B). The transaction server 105 can provide a centralized Cloud (Internet) based location for all customer's receipts. The transaction server 105 can provide pre-purchase services such as: electronic coupon/discount code management. The transaction server 105 can also provide post-purchase services such as: warranty reminders, manufacturer registrations, rebate management and others. The transaction server 105 has the ability to generate customer spending reports. The transaction server 105 can enable merchants to easily track customer 100 purchases and establish a reward system. The transaction server 105 can also have an ability to generate customer metrics which can be used to understand the merchant customer base and to measure and compare the merchant's performance against its competitors.

The present invention includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A method of completing transactions using a device, comprising:
    creating and presenting, by a merchant, a stimulus including transaction details associated therewith;
    acquiring, by the device, the stimulus;
    decoding, by the device or by a remote server, the transaction details;
    displaying, by the device, the decoded transaction details; and
    if the decoded transaction details is acceptable to a user of the device:
        accepting, by the user via the device, the decoded transaction details;
        transmitting, by the device to a remote server, a confirmation of acceptance by the user;
        transmitting, by the remote server to a payment gateway, a payment request for an amount reflected in the transaction details;
        validating, by the payment gateway, the payment request; and
        receiving, by the merchant and the user, a payment confirmation.

2. The method of claim 1, wherein the device acquires the stimulus by scanning a pictogram.

3. The method of claim 1, wherein the transaction details comprise price information, shipping information, merchant information, delivery estimates, available or applied discounts and promotions, product information including serial numbers, model, type and any combination thereof.

4. The method of claim 1, wherein the payment request includes customer billing information and merchant account information.

5. The method of claim 1, further comprising, prior to creating and presenting the stimulus by the merchant:
    transmitting, by the user, a check-out request to the merchant;
    receiving, by the merchant, the check-out request;
    transmitting, by the merchant to the remote server, the transaction details;
    receiving and saving, by the remote server, the transaction details;
    encoding, by the remote server, the transaction details;
    generating, by the remote server, the stimulus including the encoded transaction details; and
    transmitting, by the remote server to the merchant, a stimulus presentation request.

6. The method of claim 1, wherein prior to acquiring the stimulus by the device, the merchant creates and presents the stimulus on a device for conducting credit card transactions.

7. The method of claim 6, wherein the device for conducting credit card transactions is a pin pad device.

8. The method of claim 1, wherein the stimulus is present on printed media, such as a magazine advertisement or poster or wherein the stimulus is present on digital media, including a screen.

9. The method of claim 1, wherein the stimulus is embedded into an advertising image using steganography or watermarking techniques.

10. The method of claim 1, further comprising:
    transmitting, by the payment gateway to the remote server, a payment authorization code;
    receiving, by the remote server, the payment authorization code;
    transmitting by the remote server to the merchant, the payment confirmation; and
    transmitting, by the merchant to the user, the payment confirmation.

11. The method of claim 1, wherein the merchant is an individual or any entity that sells goods and/or services.

12. The method of claim 1, wherein mobile device, the merchant, the remote server and the payment gateway communicate through a secure connection including a Secure Socket Layer connection.

13. The method of claim 1, wherein the device, the merchant, the remote server and the payment gateway communicate using an Internet Protocol (IP) wireless data network.

14. The method of claim 1, wherein the payment is processed according to a method of payment selected by the user or by mobile device based on predetermined criteria, including merchant identity, reward points, user balance and amount of the payment.

15. The method of claim 1, wherein the user enters a password, passphrase or pin if the amount of the payment exceeds a predetermined threshold.

16. The system of claim 1, wherein the device is a smartphone, a tablet, a portable game console, a computer with scanning capabilities or a personal digital assistant.

17. The system of claim 1, wherein the stimulus is a combination of one of more of the group consisting of barcode, 2D barcode, coded picture, suite of symbols, image.

18. A device for completing transactions, comprising:
    processing hardware for acquiring a stimulus including encoded transaction details and for decoding the transaction details from the stimulus;
    a user interface for displaying the decoded transaction details for a user of the mobile device; and
    a signal interface configured to send a signal indicating user acceptance or rejection of the decoded transaction details to a remote server, wherein if the user has accepted the transaction details, the remote server is configured to take appropriate steps to process the transaction as defined by the transaction details, either directly or as a proxy to a subsystem charged of processing the transaction,
    wherein the signal interface is further configured to receive a signal indicating transaction completion.

19. The device of claim 18, wherein the processing hardware acquires the stimulus by scanning a pictogram.

20. The device of claim 18, wherein the transaction is a commercial transaction between a user and a merchant or a transfer of funds between two individuals or between an individual and a company.

21. The device of claim 18, wherein the signal interface is further configured to transmit to the remote server a request to register or authenticate the user, wherein the user is registered or authenticated prior to or at the same time as processing and validation.

22. The device of claim 18, wherein the transaction is completed when the user is registered or authenticated and when the payment is confirmed.

23. A system for completing transactions, comprising:
 a remote server coupled to a first processor, the remote server being configured to create a stimulus including therein an encoded set of transaction details in response to a stimulus creation request from a merchant check-out system configured to present the stimulus;
 a device configured to acquire the stimulus, wherein the device decodes the stimulus or the remote server decodes the stimulus in response to a decode stimulus request from the device, the device including a user interface configured to display a decoded set of transaction details to a user for acceptance or rejection by the user and wherein the device is configured to transmit an acceptance of the transaction details to the remote server if the user accepts the transaction details; and
 a gateway transaction system coupled to a second processor, the gateway transaction system being configured to validate and process, directly or as a proxy to a subsystem, the transaction reflected in the transaction details, the gateway transaction system being further configured to transmit a payment confirmation to the remote server.

24. The system of claim 23, wherein the device is configured to decode the stimulus by decoding the transaction details from the stimulus to a URL, wherein the device uses the URL to retrieve the transaction details.

25. The system of claim 23, wherein the remote server is configured to transmit the payment confirmation to the merchant check-out system that is configured to transmit the payment confirmation to the device.

26. The system of claim 23, wherein the stimulus is a combination of one of more of the group consisting of barcode, 2D barcode, coded picture, suite of symbols, image.

27. The system of claim 1, wherein the stimulus is a sound.

28. The system of claim 1, wherein the stimulus is a vibration.

29. The system of claim 1, wherein the stimulus is radio-frequency signals.

30. The system of claim 23, wherein the stimulus is a sound.

31. The system of claim 23, wherein the stimulus is a vibration.

32. The system of claim 23, wherein the stimulus is a combination of one of more of the group consisting of electromagnetic signals and radio-frequency signals.

* * * * *